(12) United States Patent
Valkanas et al.

(10) Patent No.: US 6,831,111 B1
(45) Date of Patent: Dec. 14, 2004

(54) METHOD AND PRODUCTS TO ABSORB OIL AND ORGANIC SOLVENTS FROM WATER AND FROM SEA

(75) Inventors: George N. Valkanas, Maroussi (GR); Ioannis Konstantakopoulos, Faliro (GR)

(73) Assignee: Innoval Management Limited, Curacao (AN)

( * ) Notice: Subject to any disclaimer, the term of this patent is extended or adjusted under 35 U.S.C. 154(b) by 0 days.

(21) Appl. No.: 09/205,297

(22) Filed: Dec. 4, 1998

Related U.S. Application Data

(63) Continuation-in-part of application No. PCT/GR97/00018, filed on Jun. 5, 1997.

(30) Foreign Application Priority Data

Jun. 5, 1996 (GR) .......................................... 960100185

(51) Int. Cl.$^7$ ............................................. C08F 212/08
(52) U.S. Cl. ........................ 521/146; 210/639; 521/148
(58) Field of Search ................................ 210/692, 693, 210/924; 521/146, 148

(56) References Cited

U.S. PATENT DOCUMENTS

| | | | | |
|---|---|---|---|---|
| 3,531,463 A | * | 9/1970 | Gustafson | 210/692 |
| 3,979,287 A | * | 9/1976 | Vulliez-Sermet et al. | 210/692 |
| 4,297,220 A | * | 10/1981 | Meitzner et al. | 210/692 |
| 4,941,978 A | * | 7/1990 | Gabrick | 210/693 |
| 5,017,436 A | * | 5/1991 | Schwarz et al. | 428/519 |
| 5,075,387 A | * | 12/1991 | Hous et al. | 525/332.8 |
| 5,460,792 A | * | 10/1995 | Rosenbaum | 210/763 |
| 5,468,536 A | * | 11/1995 | Whitcomb et al. | 210/924 |
| 2002/0042487 A1 | * | 4/2002 | Deissler et al. | 526/336 |

FOREIGN PATENT DOCUMENTS

| | | |
|---|---|---|
| EP | 0007792 A1 | 2/1980 |
| EP | 0 152780 A2 | 8/1985 |
| EP | 0153732 A2 | 9/1985 |
| EP | 0314449 A2 | 5/1989 |
| EP | 0455143 A1 | 11/1991 |
| EP | 047199 A2 | 2/1992 |
| EP | 0475578 A2 | 3/1992 |
| EP | 0 518336 A1 | 12/1992 |
| WO | WO9405724 | 3/1994 |

* cited by examiner

*Primary Examiner*—Ivars C. Cintins
(74) *Attorney, Agent, or Firm*—Birch, Stewart, Kolasch & Birch, LLP

(57) ABSTRACT

Polymeric products which after special cross-linking become macroreticular and acquire the ability to absorb organic solvents and petroleum products which are released in the water, in the amount of 40–80 gram of oily matter/gram of polymer. The macroreticular polymers include polystyrene, trimeric copolymer with styrene, ethylene, butadiene (SEBS) elastomeric SBR with styrene 10%, 20% and 40% fully hydrogenated to saturation, which after special cross-linking in chlorinated solvents with a cross-linking agent forms a thick cross-linked mass which is cut and deodorized. These products are used in a polypropylene net and are swept on the surface of water basins, harbors or the surface of sea to collect the oily matter and the petroleum by endomolecular absorption and by external surface adherence, and the loaded net is washed with petroleum to remove all absorbed oily matter as useful fuel. The net with the absorbing polymers is then ready for reuse.

8 Claims, No Drawings

METHOD AND PRODUCTS TO ABSORB OIL AND ORGANIC SOLVENTS FROM WATER AND FROM SEA

This application is a Continuation-In-Part of PCT application no. PCT/GR97/00018 filed on Jun. 5, 1997, designated the United States and on which priority is claimed under 35 U.S.C. §120, the entire contents of which are hereby incorporated by reference.

BACKGROUND

The release of organic solvents and oil into the environment and in water basins leads to disasters. The consequences of these accidents are the destruction of the environment and the disruption of the chains of life.

A most critical such environmental problem is created by the release of oil during the sea transportation because of sea accidents. Another critical problem directly connected with life is the pollution in sea ports and in enclosed seas around main cities.

Such pollution loads are also formed in navigable rivers and in lakes by ejection of petroleum and oil, and also during pumping of petroleum rivers, the lakes and in sea from existing production wells, creating heavy pollution problems.

The treating of those environmental problems is, up to date, unsuccessful, insufficient or incorrect. Detergents are used with which the suspended petroleum and oils are emulsified to become bottom sludge deposits. The sea basins thus accumulate huge pollution loads. The Mediterranean sea has intense petroleum transportation transportation traffic, and the pollution loading has become 0.3–0.8 g/liter and the bottom sludge formed exceeds the 2.000 tons/km$^3$ which makes a World maximum.

We have dealt in long lasting R & D work with this problem and have developed a solution by which these water and sea pollution accidents are successfully remediated because our solution works with absorption of the petroleum and of oils from sea and water surfaces and thus leads to their useful recycling.

DETAILED DESCRIPTION

We have discovered, constructed and proved in practice polymers multiprocessed to become macroreticular, and we have proved that these operate with effective absorption of petroleum, oil and organic solvents in a quantity 30 to 60 times their weight intermolecularly. With external sorption adherence, more quantities are absorbed so that high quantities of released petroleum and oils into the water basins are finally collected. The operation of the treatment is organized with loading these absorption products into a net which is suspended in the water surface and operates like a broom quantitatively absorbing and sweeping all the oily pollution loads which are transported in tanks, where they are washed with petroleum and are collected as useful fuel.

The absorbing products utilize polymeric products derived from new or recycled Polystyrene and copolymers in a wide range of compositions to cover a wide variety of uses. These polymers are processed to become macroreticular, a structure designed to absorb organic solvents and oil molecularly in pure form or in mixtures according to existing conditions.

The polymers bases in use are the following:

Polystyrene which after special processing becomes macroreticular with Mc 50,000.

The trimeric copolymer SEBS (Styrene, Ethylene, Butadiene, Styrene) which is specially crosslinked to become macroreticular.

Fully hydrogenated elastomeric SBR having a styrene composition 10%, 20% and 40% which after special cross-linking and processing gave macroreticular products varying in absorbtion capacity.

The cross-linking is advanced in solutions containing by weight of 20–25% polymers in chlorinated hydrocarbon solvents such as dichloroethane with cross-linking agent 1,4-dichloromethyl-2,5-dimethylbenzene-(DCMDMB) and, for catalytic action, tectrachlorotitane (TiCl4) is used in 10% solution in dichloroethane.

The appearance of thickness that is the cross-linking result, relates to the added catalyst. However, small quantities of catalyst added deprise is effective in high solution volumes.

In the following Tables are given the results of the weight ratio of cross-linking agent to the SEBS polymer in reaction at 60° C. To determine the absorption capacity, the porosity is studied, which was found to be low up to 4% of cross-linking agent and then increases.

TABLE 1

DCMDMB, % SEBS, resulted porosity

| | (cm$^3$/g) |
|---|---|
| 1 | 0.294 |
| 2 | 0.204 |
| 4 | 0.279 |
| 16 | 0.319 |
| 32 | 0.477 |

The absorption capacity of organic solvents selected from market products, derived from petroleum, was then studied

TABLE 2

| C initial PPM | C finalPPM |
|---|---|
| Absorption of Toluene in water-PS | |
| 413.9 | 0.68 |
| 102.1 | 0.59 |
| 363.3 | 0.78 |
| Absorption of Toluene Water-SEBS | |
| 410.4 | 0.4 |
| 319.6 | 0.39 |
| 119.9 | 0.37 |
| Absorption of 1,2-Dichlorethane-Water, SEBS | |
| 692.2 | 0.4 |
| 202.7 | 0.56 |
| Absorption of Decane-water, SEBS | |
| 456.2 | 0.35 |
| 623.4 | 0.37 |
| Absorption of Petrol-water, SEBS | |
| 653.4 | 0.36 |
| 638.2 | 0.34 |

TABLE 3

Absorption capacity of the different absorption products per gram.

| | 1 | 2 | 3 | 4 | 5 | 6 | 7 | 8 | 9 | 10 | 11 | 12 | 13 |
|---|---|---|---|---|---|---|---|---|---|---|---|---|---|
| PS | — | — | — | — | — | — | — | 12 | 17 | 28 | 25 | 18 | 18 |
| SEBS | 4.5 | 7.5 | 9.0 | 5.0 | 8 | 9.0 | 6.0 | 17 | 18 | 18 | 12 | 22 | 22 |
| SBR (10) | 50.0 | 45.0 | 40.0 | 30.0 | 32.0 | 29.0 | 33.0 | 36 | 37 | — | — | 16 | 15 |
| SBR (20) | 48.0 | 40.0 | 38.0 | 25.0 | 27.0 | 26.0 | 31.0 | 31.0 | 32 | — | — | 12 | 13 |

1 n-pentane,
2 n-hexane,
3 n-octane,
4 isooctane,
5 n-nonane,
6 n-decane
7 n-dodecane
8 benzene,
9 toluene,
10 chloroform,
11 carbon tetrachloride,
12 1,2 dichloroethane,
13 1,1,3 trichloroethane.

The above results are successful and very useful. We also have studied the absorption capacity on oil surface pollution in harbors and the absorption capacity in sea. For these trials, the absorption polymers were placed in a polypropylene net in composition 20% PS, 30% SEBS, 30% SBR (10) and 20%, SBR (20) and the results obtained were very impressive. It proved that the sweeping was not due to endomolecular absorption but also due to external absorption adherence so that the collection of oily matter was very satisfactory. The load of oily matter is collected in a tank and is washed with petroleum by which all those oils are collected as useful fuels. That is this seeping action makes the pollution loads useful and the harbours and the sea as well as the sea bottom are liberated from oily and dirty matter, and the ecology is overall improved.

EXAMPLE 1

In a reactor of 0.5 m$^3$ capacity is brought (a), 200 liter dicholethane and is added (b) 20 kg of the polymer dichromethyl-2,5-dichlorobenzene and at 60° C. is added (d) the catalyst TiCl4 as 10% solution. After agitation for 40 minutes the cross-linking started and the solution becomes viscous and thick and cannot be agitated further. The product is taken off and is cut in a mincing machine and then is brought to a reactor for taking the solvent out to become commercial product. The reactor is heated up to 170° C. under vacuum and stirring so that all the solvent is taken off and the polymeric product is completely deodorized.

Under the same conditions the polystyrene is treated and the SBR 10%, 20% and 40% in Styrene fully hydrogenated to saturation with the addition of the 2% crosslinking agent in all, calculated on the benzene rings present.

EXAMPLE 2

Products of example 1 in composition quantities Polystryrene 30%, cross-linked SEBS 30%, cross-linked SBR 10% in Styrene, fully hydrogenated to saturation 20% and SBR 20% in Styrene fully hydrogenated to saturation 20%, are brought a polypropylene net and are swept along on a harbour surface. By sweeping the surface all oily matter is collected in quantity 20% endomolecularly and in quantity 80% adhered externally. The net with the loaded polymers is brought to a tank and washed with petroleum and the oily matter is recycled as fuel and the absorption polymers are ready to be reutilized.

EXAMPLE 3

Products of example 1 in composition quantities 10% crosslinked Polystyrene , 30% crosslinked SEBS , 40% crosslinked SBR ,10% in Styrene fully hydrogenated to saturation, are brought to sweep sea surface pollution. The oil surface swept was that apart from the main oxidised petroleum mass, which is collected otherwise. The materials of the net were drawn by about to successfully sweep the sea surface All the oily water was collected and the sea net was brought to a tank. Washing the net with petroleum reclaimed the absorbed oily matter which was recycled as fuel, and the sea and the sea bottom pollution is avoided.

EXAMPLE 4

In a lake there is released petroleum and organic solvents from transportation and from production wells, the net of example 3 is swept on the surface while being drawn by a boat. The oily matter swept was by 25% endomolecularly absorbed and by 75% externally absorbed-adhered. It was collected in a tank and washed with petroleum to collect the oily matter absorbed as fuel and the net with the absorbing polymers was recycled for reuse.

EXAMPLE 5

The polymer net of example 4 is placed at the flow of a river, the water of which contains oily matter. The action on the river was to collect all suspended oily matter, and the water flow is established with natural pure water flow.

What is claimed is:

1. A macroreticular product having a high potential to absorb organic solvents, wherein the product is formed by cross-linking a polymer so that the macroreticular product can molecularly enclose the organic solvent and the organic solvent can externally adhere to the product, wherein the cross-linking is performed with 1,4-dichloromethyl-2,5-dichloromethyl-2,5-dimethylbenzene, and wherein the polymer is at least one selected from the group consisting of polystyrene, SEBS, elastomeric SBR, and hydrogenated elastomeric SBR.

2. The product according to claim 1, wherein the elastomeric SBR has 10%, 20% or 40% styrene.

3. The product according to claim 1, wherein the cross-linking is performed in chlorinated solvent using, as a crosslinking agent, 1,4-dichloromethyl-2,5-dimethylbenzene and $TiCl_4$.

4. The product according to claim 3, wherein the $TiCl_4$ is a 10% $TiCl_4$ solution in the chlorinated solvent.

5. The product according to claim 3, wherein the chlorinated solvent is dichloroethane.

6. The product according to claim 3, wherein the polymer is SEBS and a ratio of 1,4-dichloromethyl-2,5-dimethylbenzene to SEBS is greater than 4%.

7. The product according to claim 3, wherein the crosslinking is performed at a temperature of 60° C.

8. The product according to claim 1, wherein the product has Mc of 50,000.

* * * * *